United States Patent
Meier et al.

(10) Patent No.: US 7,362,776 B2
(45) Date of Patent: Apr. 22, 2008

(54) METHOD FOR MULTICAST LOAD BALANCING IN WIRELESS LANS

(75) Inventors: Robert C. Meier, Cuyahoga Falls, OH (US); Stuart Norman, Don Mills (CA); Douglas A. Smith, Stouffville (CA); Nancy Cam Winget, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 420 days.

(21) Appl. No.: 10/978,615

(22) Filed: Nov. 1, 2004

(65) Prior Publication Data

US 2006/0094440 A1    May 4, 2006

(51) Int. Cl.
*H04L 12/28* (2006.01)
*H04L 12/66* (2006.01)
*H04J 3/16* (2006.01)
*H04M 1/00* (2006.01)

(52) U.S. Cl. ................. 370/468; 370/395.21; 370/390; 455/453; 455/456.2

(58) Field of Classification Search ................ 370/468, 370/395.2, 395.21, 395.4, 390, 328, 331, 370/332; 455/456, 448, 449, 451, 452, 453
See application file for complete search history.

(56) References Cited

U.S. PATENT DOCUMENTS

| | | | |
|---|---|---|---|
| 5,497,504 A * | 3/1996 | Acampora et al. | 455/436 |
| 5,896,573 A | 4/1999 | Yang et al. | |
| 6,128,279 A | 10/2000 | O'Neil et al. | |
| 6,690,939 B1 | 2/2004 | Jonsson et al. | |
| 7,151,762 B1 * | 12/2006 | Ho et al. | 370/338 |
| 7,162,250 B2 * | 1/2007 | Misra | 455/453 |
| 7,203,183 B2 * | 4/2007 | Cromer et al. | 370/338 |

* cited by examiner

*Primary Examiner*—Hanh Nguyen
(74) *Attorney, Agent, or Firm*—Tucker Ellis & West LLP (57) ABSTRACT

A method for multicast load balancing in a wireless network having a plurality of access points. The method includes setting a maximum Internet protocol multicast bandwidth for the access points, receiving an admissions control request from a client at one of the access points, and determining whether the admissions control request from the client is for an admitted or unadmitted multicast stream at the access point. The access point is responsive to the admissions control request for the admitted multicast stream by servicing the admitted multicast stream and to the admissions control request for the unadmitted multicast stream by servicing the unadmitted multicast stream where the bandwidth required for the unadmitted multicast stream, plus that portion of the access point bandwidth currently used for all existing downlink multicast streams, does not exceed the maximum internet protocol multicast bandwidth for the access point.

24 Claims, 5 Drawing Sheets

METHOD FOR MULTICAST LOAD BALANCING IN WIRELESS LANS

BACKGROUND OF THE INVENTION

The present invention relates generally to wireless networks and more particularly to a system and method for multicast load balancing.

Multicast traffic is problematic in Institute of Electrical and Electronics Engineers (IEEE) 802.11 networks for a number of reasons. For example, high bandwidth multicast streams, such as video streams, can consume excessive bandwidth and potentially starve unicast streams. An IEEE 802.11 Basic Service Set (BSS) is the area covered by a single IEEE 802.11 access point. If an IEEE 802.11 Basic Service Set contains a single power-save client, i.e., a client capable of transitioning into a low-power mode as necessary, then all multicast or broadcast frames are sent in a multicast delivery period that follows a delivery traffic information message beacon. High priority unicast transmissions are stalled during the multicast delivery period. Thus, long multicast delivery periods have a significant adverse effect on IEEE 802.11 client power management. For example, a power-save client must stay awake for the entire multicast delivery period, even if the client only occasionally receives a broadcast address resolution protocol frame or other multicast frame.

One approach to this problem is to "rate limit" the total multicast traffic transmitted by an access point by configuring the maximum bandwidth used for multicast as a percentage of the total bandwidth. Under this approach, an access point simply discards new multicast frames whenever the percentage of bandwidth consumed for multicast traffic exceeds the configured maximum percentage. Such simple multicast rate limiting mechanisms are not sufficient, especially on low bandwidth access points, because simple rate limiting discards both useful and useless multicast frames.

Thus, there is a need for an alternative wherein an access point can use more fine grained, stream specific multicast rate limiting to support multicast streams well, rather than simple gross rate limiting of all streams.

In a wireless local area network, existing load balancing algorithms have been used to distribute wireless traffic across multiple access points in an overlapping coverage area as a function of the available bandwidth on each access point. In a typical load balancing implementation, access points advertise channel load information and clients migrate smoothly to the access point with the lightest load. The aggregate bandwidth in a Hot Spot area, e.g., a conference room, can be increased, for example, if multiple access points cover the Hot Spot area and the traffic load is "load balanced" across those access points. Load balancing can also be used to migrate clients from low bandwidth umbrella channels to high bandwidth Hot Spot access points whenever possible.

An IEEE 802.11 client's "load share" is that portion of the total load on the client's parent access point that is directly attributable to the client. A client's "unicast load share" is simply calculated as the total airtime used for frames sent to or from the client. It is much more difficult to calculate a client's "multicast load share."

Load balancing algorithms are typically only effective in distributing the unicast traffic load across access points. For example, suppose a client is sending unicast frames and receiving both unicast and multicast frames. If the client roams from a first access point to a second access point, the client's unicast load shared is transferred from the first access point to the second access point. However, the multicast load on the first access point may not decrease and the multicast load on the second access may not increase after the client roams.

In some instances, load balancing can reduce the aggregate available bandwidth in a Hot Spot covered by multiple access points. For example, assume a conference room covered by at least two or more access points, and further assume that some clients must receive a high bandwidth Internet Protocol Television multicast stream. If the Internet Protocol Television clients are distributed across the access points using simple load balancing, then all of the access points must forward the Internet Protocol Television multicast steam. This greatly reduces the available bandwidth on all of the access points.

Thus, there is a need for a method for efficiently distributing high bandwidth clients, e.g., Internet Protocol Television clients, within a group of access points, thereby increasing the available bandwidth. Moreover, there is a need for a method for multicast load balancing in wireless networks.

SUMMARY OF THE INVENTION

The present invention provides a system and method wherein an access point can use more fine-grained, stream-specific multicast rate limiting to support multicast streams, rather than distributing multicast streams by simple gross rate limiting of all streams. The present invention also includes a system and method that associates high bandwidth clients, e.g., Internet Protocol Television clients, with a single access point or a subset of access points of a multicast access group (MCAG) that forwards the high bandwidth stream, thereby increasing the available bandwidth of the remaining access points within the multicast access group. In addition, the present invention includes a system and method for multicast load balancing in wireless networks.

In accordance with the present invention there is disclosed herein an access point including a transceiver for receiving an admissions control request from a client and a controller coupled to the transceiver for setting a maximum multicast bandwidth for the access point. The controller is configured for determining whether the admissions control request from the client is for an existing admitted multicast stream, an existing unadmitted multicast stream, or for a new multicast stream, each stream having a bandwidth. A new multicast stream may be admitted if the bandwidth of the new stream plus the bandwidth currently used for all existing multicast streams does not exceed the total bandwidth allocated for multicast streams. The access point is responsive to the admissions control request for an admitted multicast stream by servicing the admitted multicast stream and to the admissions control request for the unadmitted multicast stream by servicing the unadmitted multicast stream where the bandwidth required for the unadmitted multicast stream, plus that portion of the access point bandwidth currently used for all existing downlink multicast streams, does not exceed the maximum internet protocol multicast bandwidth for the access point. If a client's admission control request for a multicast stream is rejected at a first AP then the client searches for another AP that can accept the admissions control request; therefore, clients migrate to APs that can support the clients' multicast streams.

The bandwidth required for a multicast stream is determined from parameters contained in an admissions control request or by measuring the bandwidth consumed by the multicast stream over a period of time. An IP multicast router, for example, may measure the bandwidth consumed by a multicast stream, which it is forwarding, and the IP multicast router may forward multicast bandwidth information to a multicast admissions controller coupled to APs.

Further in accordance with the present invention there is disclosed herein an access point including a transceiver for receiving a request from a client for a multicast stream, where either the access point or the client does not support admissions control, and a controller coupled to the transceiver configured for determining whether the request is for an existing admitted multicast stream, an existing unadmitted multicast stream, or for a new multicast stream. A new multicast stream may be admitted if the bandwidth of the new stream plus the bandwidth currently used for all existing multicast streams does not exceed the total bandwidth allocated for multicast streams. The access point is responsive to the request by forwarding an admitted multicast stream to the client and to the request for an unadmitted multicast stream by rate limiting the unadmitted multicast stream to the client.

Still further in accordance with the present invention there is disclosed herein a method for multicast load balancing in a wireless network including a plurality of access points. The method includes setting a maximum Internet protocol multicast bandwidth for the access points, receiving an admissions control request from a client at one of the access points, and determining whether the admissions control request from the client is for an admitted multicast stream or an unadmitted multicast stream at the access point. An access point is responsive to the admissions control request for the admitted multicast stream by servicing the admitted multicast stream and to the admissions control request for the unadmitted multicast stream by servicing the unadmitted multicast stream where the bandwidth required for the unadmitted multicast stream, plus that portion of the access point bandwidth currently used for all existing downlink multicast streams, does not exceed the maximum internet protocol multicast bandwidth for the access point.

Yet further in accordance with the present invention there is disclosed herein a method for multicast load balancing in a wireless network including a plurality of access points. This method includes receiving a request from a client for a multicast stream at one of the access points, wherein either the access point or the client does not support admissions control, and determining whether the admissions control request is for an admitted multicast stream or an unadmitted multicast stream. The access point is responsive to the request by forwarding an admitted multicast stream to the client and by rate limiting the unadmitted multicast stream to the client. The present invention also includes an access point configured to perform the method.

Still further in accordance with the present invention there is disclosed herein a method for organizing a plurality of access points, which cover the same area on different radio channels, into a Multicast Admissions Group. An AP in a Multicast Admissions Group only accepts an admission control request for a new downlink multicast stream if it has the required available multicast bandwidth and the multicast stream is not already active on a different AP in the same Multicast Admissions Group. If a first AP rejects a client's admission control request because the respective multicast stream is active on a second AP in the same Multicast Admissions Group, then the first AP may explicitly redirect the client to the second AP.

These and other objects and advantages of the present invention will become readily apparent to those skilled in this art from the following description wherein there is shown and described a preferred embodiment of this invention, simply by way of illustration of one of the best modes suited to carry out the invention. As it will be realized, the invention is capable of other different embodiments and its several details are capable of modifications in various obvious aspects all without departing from the spirit of the present invention. Accordingly, the drawings and descriptions will be regarded as illustrative in nature and not as restrictive.

DETAILED DESCRIPTION OF THE INVENTION

In a high density access point network, reducing the access point cell size, thereby reducing the number of clients in each cell, increases the bandwidth for a client. In a typical high density installation, low density, low bandwidth Institute of Electrical and Electronics Engineers (IEEE) 802.11b/g access points with relatively greater range provide "umbrella channels" that cover the entire installation, while high bandwidth, short range IEEE 802.11a access points provide small "high bandwidth overlay cells" in selected "Hot Spot" areas, such as in conference rooms, offices, etc. Multiple APs may be installed to cover the same area to further increase the available bandwidth in a Hot Spot Area. For example, in a conference room, installing multiple access points with overlapping coverage areas on different radio channels can increase the total available bandwidth. The umbrella coverage enables an IEEE 802.11b/g client or a dual mode 802.11g/802.11a client to roam seamlessly throughout the installation. Furthermore, the high bandwidth overlay cells provide dedicated bandwidth for a small number of users or high bandwidth, for applications such as Internet Protocol Television or interactive video conferencing, in the selected Hot Spot areas.

Relatively low bandwidth access points on the umbrella channels typically do not have enough bandwidth to support high bandwidth multicast applications, such as Internet Protocol Television. However, low bandwidth access points on umbrella channels could be used to support some low bandwidth Internet Protocol multicast applications. For example, an IEEE 802.11 Voice over Internet Protocol client, which roams throughout an enterprise wireless local area network, or a low bandwidth multicast paging application.

As will be described hereinafter, the present invention provides a method that segregates high bandwidth multicast applications, such as Internet Protocol Television, to high bandwidth access points.

In other networks, dual mode IEEE 802.11g/a clients need to be able to roam seamlessly between 802.11b/g access points and 802.11a access points without changing subnets. Therefore, access points on the umbrella channels cannot always be isolated from broadcast or multicast traffic on Hot Spot channels using Internet protocol subnetting.

Figure 1:
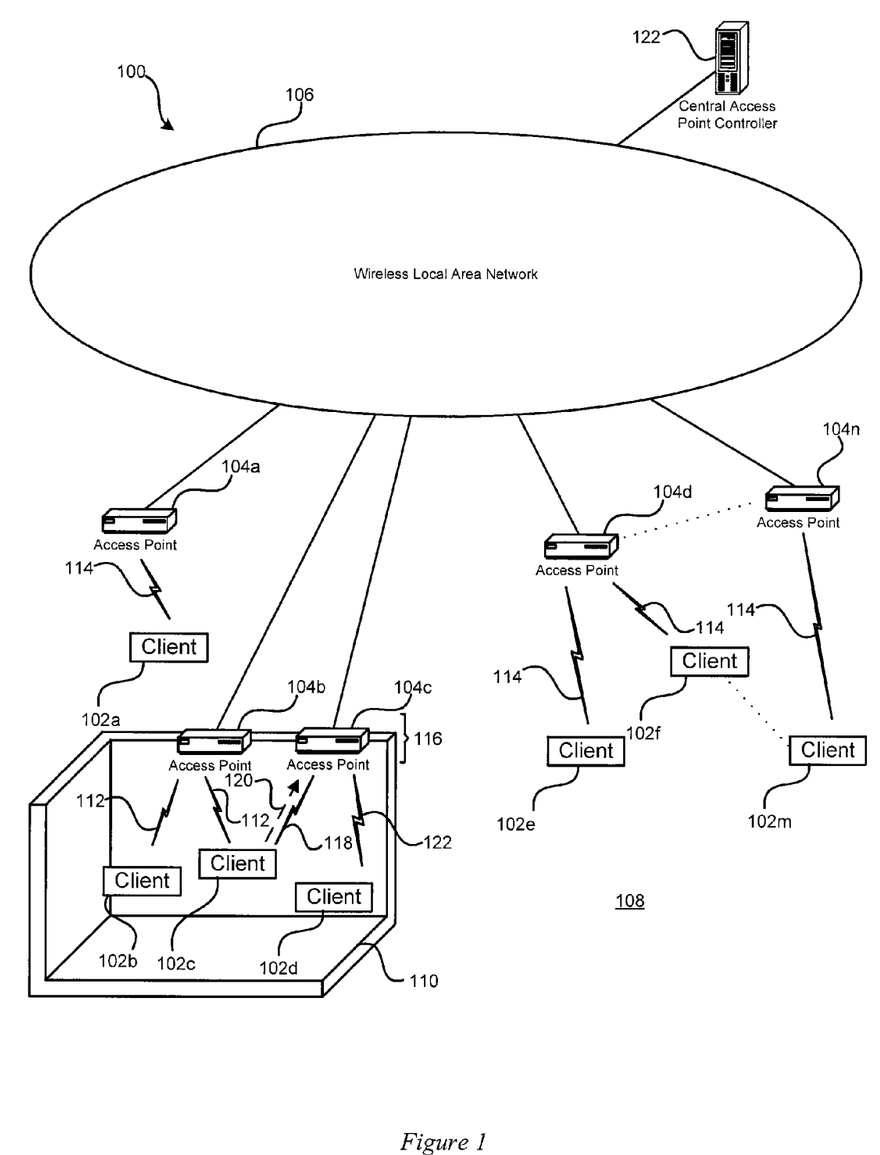
FIG. 1 is a block diagram of a wireless local area network including a number of access points in accordance with principles of the present invention.

With reference to FIG. 1, one embodiment 100 of a wireless local area network in accordance with principles of the present invention is shown. Wireless local area network 100 is configured to provide wireless communications for a number of clients 102a-m, where "m" is an integer greater than one and denotes any number of clients. Wireless local area network 100 and clients 102a-m operate in accordance with the IEEE 802.11 standard in any one of a number of designated frequency bands using a number of similarly designated channels. Wireless clients 102a-m are suitably power-save clients, i.e., clients capable of transitioning into a low power mode as necessary.

Wireless network 100 is defined by a plurality of access points 104a-n, where "n" is an integer greater than one and denotes any practical number of access points. Access points 104a-n are advantageously interconnected using a backbone network 106. Access points 104a-n are suitably a combination of low bandwidth IEEE 802.11b/g access points 104a, 104d-n and high bandwidth IEEE 802.11a access points 104b, 104c. Access points 104a, 104d-n are configured to provide "umbrella channels" that cover the entire installation 108, while access points 104b, 104c are configured to provide small "high bandwidth overlay cells" in selected Hot Spot areas, such as in a conference room or office 110.

Are used herein, "clients" refers to devices that operate in accordance with the IEEE 802.11a, 802.11b, or 802.11g standards, or some combination thereof, and roam throughout the installation 108. Generally, IEEE 802.11b clients are relatively low bandwidth clients, while 802.11g and 802.11a clients are relatively high bandwidth clients. An 802.11g AP may concurrently support both 802.11b and 802.11g clients; however an 8011.g AP must transmit a downlink multicast stream at a lower 802.11b rate if a single 802.11b client must receive the stream. More radio channels are available in the 802.11a spectrum; therefore, more 802.11a APs can be overlapped on different radio channels in the same Hot Spot area to greatly increase the available bandwidth in the Hot Spot area. For example, and from time to time, clients 102a-m and access points 104a-n engage in both high data rate or high bandwidth multicast application 112, such as Internet Protocol Television, and low data rate or low bandwidth multicast applications 114, such as Voice over Internet Protocol paging.

In accordance with principles of the present invention, a system and method is provided that uses access point multicast admissions control to distribute multicast streams across access points in the same coverage area. More specifically, and for example, the system and method maximizes the aggregate available bandwidth in Hot Spot areas 110 covered by multiple access points 104b, 104c, enables low bandwidth access points 104a, 104d-n, e.g., on an umbrella channel, to effectively support low bandwidth multicast applications 114, protects low bandwidth access points 104a, 104d-n from high bandwidth multicast streams 112, and redirect clients 102b, 102c with high bandwidth multicast applications 112 to high bandwidth access points 104b, 104c.

Those of ordinary skill in the art with appreciate that the present invention is also applicable to enterprise wireless local area networks that include clients with multimedia applications, such as Internet Protocol Television and Voice over Internet Protocol applications. Moreover, the method enables Voice over Internet Protocol applications to co-exist with high bandwidth multicast applications, such as Internet Protocol Television, in select areas. Similarly, methods in accordance with the present invention are also suitably used in a public wireless access area provide by a wireless Internet Service Provider.

The access point multicast admissions control used to distribute multicast streams 112 across access points 104b, 104c in the same coverage area 110 can be either "explicit" or "implicit." For example, the admissions control protocols defined in the IEEE 802.11e draft specification or the WiFi Wireless Multimedia Enhancements specification are suitably used for explicit admissions control. Similarly, Internet Group Management Protocol (IGMP) snooping is suitably used as the basis for implicit admissions control.

Further in accordance with principles of the present invention, an access point receiving an admissions control request from a client is a member of a "Multicast Admissions Control Group." As shown, multiple access points 104b, 104c, which cover the same area 110 on different radio channels, are grouped into a "Multicast Admissions Control Group" 116. For example, when an access point 104c in the Multicast Admissions Control Group 116 receives an admissions control request 120 (shown in dashed line) from a client 102c, access point 104c accepts the admissions control request for a "new" downlink multicast stream if it has the required available multicast bandwidth and the multicast stream is not already active on another access point, such as access point 104b, in the same Multicast Admissions Control Group 116. As shown in FIG. 1, the multicast stream 112 is active on access point 104b. In addition, if a first access point 104c rejects a client's 102c admission control request because the respective multicast stream 112 is active on a second access point 104b in the same Multicast Admissions Control Group 116, then the first access point 104c may explicitly redirect the client 102c to the second access point 104b. Furthermore, one or more access points 104c in the Multicast Admissions Control Group 116 are suitably reserved for unicast Quality of Service applications, such as Voice over Internet Protocol, so that unicast applications 118, which can not tolerate long delays, are not stalled by long multicast delivery periods following a Delivery Traffic Indication Message Beacon.

Multicast admissions control for the Multicast Admissions Control Group 116 is suitably coordinated by a central access point controller 122, such as wireless domain server, that is in communication with the access points 104b, 104c in the Multicast Admissions Control Group 116. Access points 104b, 104c in the Multicast Admissions Control Group 116 forward multicast admissions control requests 120 from clients 102c to the central access point controller 122, such that the central access point controller 122 makes admissions control decisions, applying load balancing. Alternatively, one of access points 104b, 104c can be suitably adapted to provide the functionality of central access point controller 122.

In accordance with another aspect of the present invention, a client 102c is able to determine which access point 104b will accept an admissions control request 120 for a downlink multicast stream 112 without iteratively associating and authenticating with multiple potential parent access points 104b, 104c. For example, to determine which access point 104b will accept an admissions control request 120 for a downlink multicast stream 112, the client 102c suitably includes the multicast admissions control request 120 in an IEEE 802.11 Probe Request. The access point 104c, in turn, suitably indicates multicast bandwidth availability in a Probe Response or Beacon frame. Thus, the client 102c is able to determine which access point (access point 104b in this example) will accept the admissions control request 120 for a downlink multicast stream 112 without iteratively associating and authenticating with multiple potential parent access points 104b, 104c.

Still referring to FIG. 1, not all clients and/or access points need support admissions control to receive network service. For example, an access point 104c can still support low bandwidth multicast streams 122, without using admissions control, by rate limiting unadmitted multicast streams. If, for example, clients 102d do not support admissions control or "explicit" admissions control, then an access point 104c can use "implicit" admissions control. The access point, e.g., 104c, can use IGMP snooping and intelligent IP multicast filtering to filter useless multicast transmissions. In that case, an access point only forwards IP multicast frames into an 802.11 BSS if there are members of the respective multicast group in the same BSS. The share of an access point's traffic load contributed by a multicast stream is the same whether there is one client or multiple clients in the access point's BSS in the respective multicast group. In effect, only the first client in a BSS to join a multicast group, or the last client to leave a multicast group, effects the access point's multicast load. Further, implicit multicast admissions control can be used to selectively admit some multicast streams and severely rate limit other multicast streams, as an alternative to gross rate limiting of all multicast streams.

Figure 2:
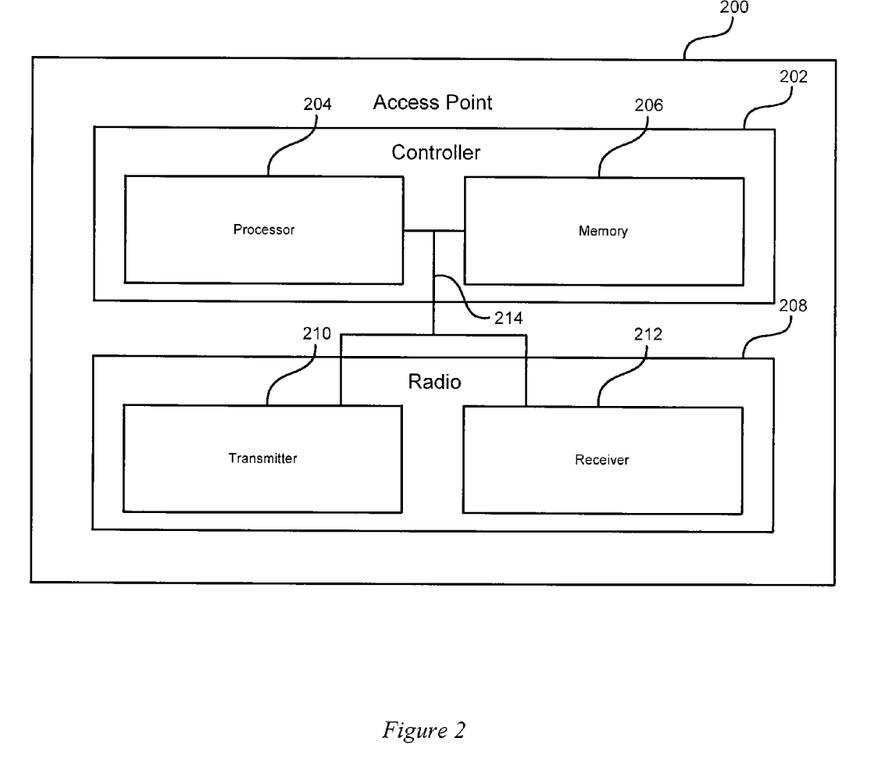
FIG. 2 is a block diagram of an access point in accordance with principles of the present invention.

FIG. 2 shows a block diagram of an embodiment 200 of an access point in accordance with principles of the present invention. Access point 200 is generally configured for operation in wireless local area network, such as wireless local area network 100 shown in FIG. 1. Access point 200 generally comprises a controller 202 and a transceiver 208. Controller 202 includes a processor 204 and a memory 206, while transceiver 208 includes a transmitter 210 and a receiver 212. A path 214 couples processor 204, memory 206, transmitter 210, and receiver 212. Path 214 can be any wired or wireless connection, e.g., a data bus. Data to be transmitted from transmitter 210 can be stored in memory 206 and sent via path 214 from memory 206 to transmitter 210. Likewise, data received from receiver 212 can be sent via path 214 to memory 206 for storage and subsequent processing by processor 204.

In use, processor 204 executes program code stored in memory 206 to control the operation of transmitter 210 and receiver 212. Transmitter 210 and receiver 212 are generally used for sending communications signals to and receiving communications signals from clients, including receiving admissions control requests. More specifically, and in accordance with principles of the present invention, the "maximum internet protocol multicast bandwidth" is set, such as by storing a value or parameter in memory 206. The maximum multicast bandwidth parameter value may be statically configured or it may be calculated dynamically, for example, as a function of the overall available bandwidth in a coverage area. Packets to be sent are likewise stored in memory 206. Received packets are also stored in memory 206. The maximum multicast bandwidth sets or determines the maximum bandwidth that can be used for downlink multicast streams by the access point 200.

Figure 3:
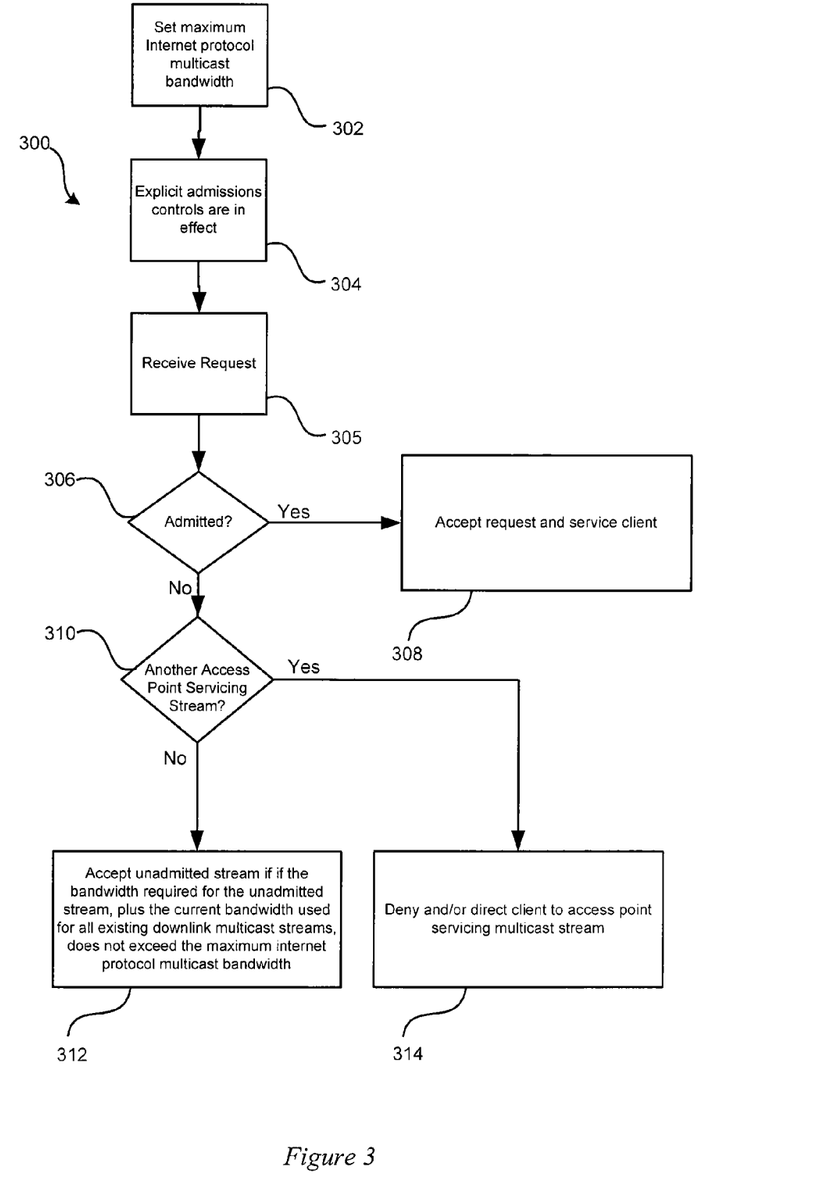
FIG. 3 is a flowchart illustrating a method for processing an admissions controls request in a wireless local area network.

FIG. 3 shows a flowchart for a method 300 for processing an admissions control request in a wireless network. Generally, in a wireless network, a client sends an admissions control request to an access point comprising the network to receive a downlink multicast stream. For example, at 302, an access point is configured with a "maximum internet protocol multicast bandwidth" parameter, which is set to the maximum bandwidth that can be used by the access point for downlink multicast streams.

At 304, the access point suitably advertises that explicit admissions controls are in force for video and/or voice streams, for example, using Wireless Multimedia Enhancements/Institute of Electric and Electronics Engineers 802.11e "Admissions Control Required Flags." This requires a client to use explicit admissions controls in order to ensure that rate limiting will not applied to the requested downlink multicast stream.

At 305, the access point receives an admissions control request for a downlink multicast stream from the client. At 306, a determination is made whether the request is for a "new" or unadmitted stream or a "previously admitted" or admitted stream. At 308, if the stream is an admitted stream, the request is accepted and the client is serviced. However, if the stream is a new or unadmitted stream, a determination is made whether another access point within the Multicast Admission Control Group is servicing the stream at 310.

At 312, if the stream is not being serviced by another access point, the unadmitted stream is accepted if the bandwidth required for the unadmitted stream, plus the current bandwidth used for all existing downlink multicast streams, does not exceed the maximum internet protocol multicast bandwidth parameter value established at 302, and the client is serviced. However, if another access point is already servicing the stream, the access point denies access to the client and the client must search for an AP that can admit the multicast stream. The AP directs the client to the access point servicing the multicast stream at 314 to minimize the client's search time.

Figure 4:
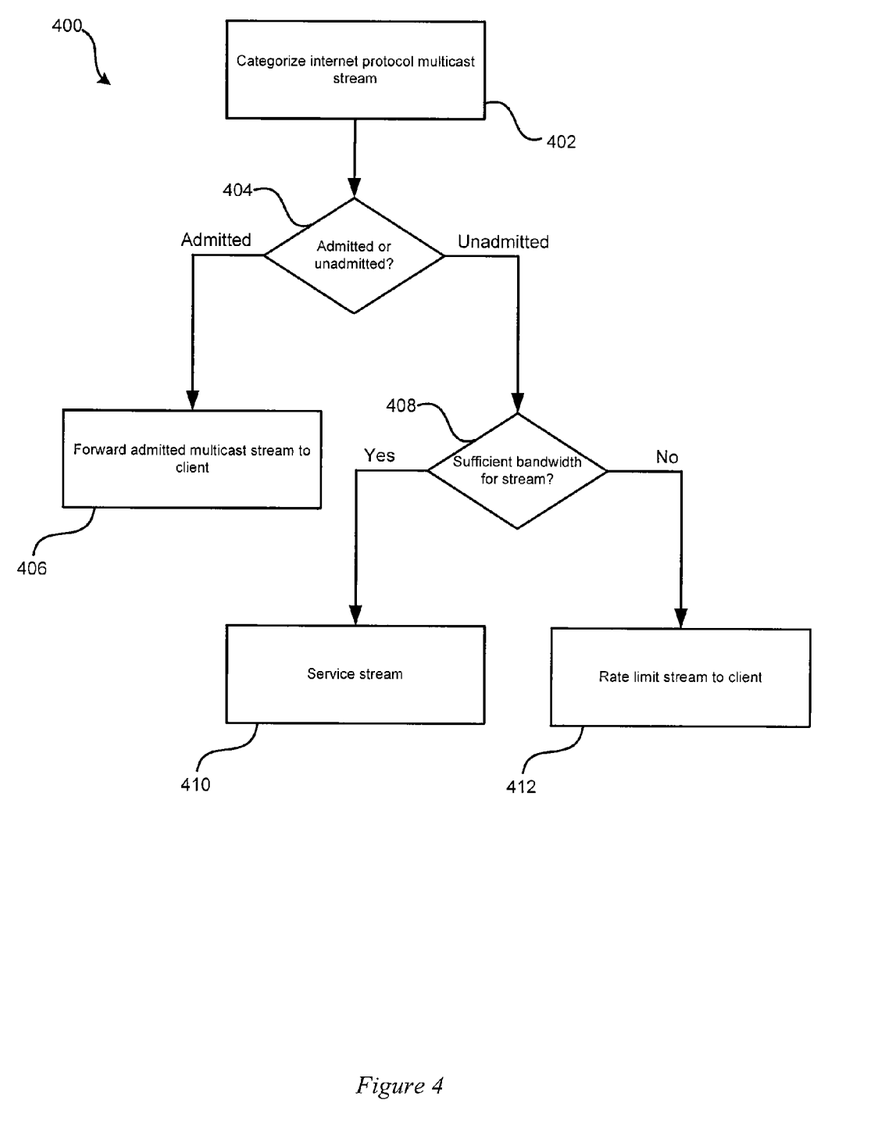
FIG. 4 is a flowchart illustrating a method for FIG. 4 for an access point using implicit admissions control.

FIG. 4 shows a flowchart for a method 400 for an access point using implicit admissions control to prevent excessive downlink multicast traffic from disrupting multicast and unicast communications. More specifically, in this example the method 400 is based on Internet Group Management Protocol snooping if Internet Protocol multicast streams.

At 402, the access point categorizes an Internet protocol multicast stream, identified by a destination multicast address, or optionally by a multicast destination IP address and a unicast source IP address, using Internet Group Management Protocol snooping. At 404, a determination is made whether the Internet protocol multicast stream is admitted or unadmitted. If the Internet protocol multicast stream is admitted, the access point forwards all frames that belong to the implicitly admitted downlink multicast stream to the client at 406. However, if the Internet protocol multicast stream is unadmitted, a determination is made whether sufficient bandwidth is available for the stream at 408.

If there is sufficient bandwidth available for the multicast stream, the access point services the multicast stream at 410. However, if there is insufficient bandwidth available for the multicast stream, the access point rate limits frames that belong to the unadmitted multicast stream to the client at 412. Thus, implicit admissions control can be used to protect admitted or unadmitted low bandwidth multicast streams and admitted high bandwidth multicast streams from high bandwidth unadmitted multicast streams when the total offered multicast load is greater than the available multicast bandwidth available from the access point.

Figure 5:
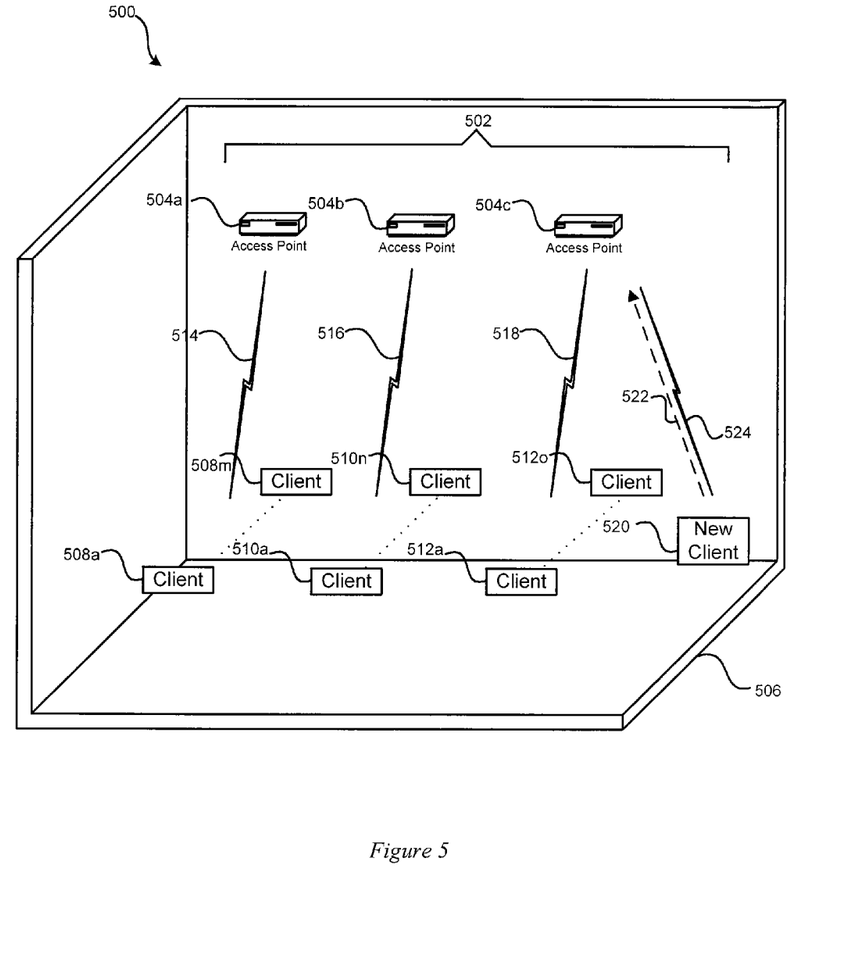
FIG. 5 is an illustration of an exemplary scenario of the application of a method in accordance with principles of the present invention.

FIG. 5 is an illustration of a scenario 500 exemplifying the application of a method in accordance with principles of the present invention. In this example scenario 500, Multicast Admissions Control Group 502 contains three access points 504a-c, which cover the same Hot Spot area 506 on different channels. Each access point 504a-c is configured to admit at least one high bandwidth downlink multicast stream. Three sets of clients 508a-m, 510a-n, 512a-o, when "m," "n," and "o" are integers greater than one and each denote any practical number of clients, are associated with the access points 504a-c. In this example, the first set of clients 508a-n receives a first high bandwidth multicast stream 514, the second set of clients 510a-n receives a second high bandwidth multicast stream 516, and the third set of Voice over Internet Protocol clients 512a-o does not need to receive a high bandwidth multicast stream 518.

The first access point 504a admits the first multicast stream 514 for one of the clients 508a in the first set of clients 508a-m, and the second and third access points 504b, 504c reject the first multicast stream 514 using admissions control as described in conjunction with FIG. 3. Therefore, other clients 508b-m within the first set of clients 508a-m migrate to the first access point 504a.

Similarly, the second access point 504b admits the second multicast stream 516 for one of the clients 510a in the second set of clients 510a-n using admissions control. Therefore, other clients 510b-n within the second set of clients 510a-n migrate to the second access point 504b.

The Voice over Internet Protocol clients in the third set of clients 512a-o migrate to the most lightly loaded access point based on load balancing. Therefore, clients in the third set of clients 512a-o migrate to the third access point 504c. In this example scenario 500, access point 540c is the most lightly loaded access point because it does not forward either multicast stream 514, 516.

The skilled artisan will appreciate that the multicast stream load, e.g., multicast streams 514, 516, is distributed, i.e., multicast load balanced, between the first and second access points 504a, 504b, respectively. The skilled artisan will also appreciate that the multicast streams 514, 516 do not adversely affect the Voice over Internet Protocol unicast traffic 518 on the third access point 504c. Furthermore, Voice over Internet Protocol communications 518 are not stalled by long power-save multicast delivery periods on the third access point 504c.

Thus, as demonstrated by the scenario 500 shown in FIG. 5, and in accordance with principles of the present invention, access points 504a-c within the same coverage area 506 are grouped into a Multicast Admission Control Group 502. Admissions control is used to distribute high bandwidth multicast streams 514, 516 within the Multicast Admissions Control Group 502, so that the total bandwidth available for multicast streams 514, 516 and unicast streams 518 is increased. Furthermore, select access points, e.g., access point 504c, in a Multicast Admissions Control Group 502 are suitably reserved for unicast streams, such as, for example, Voice over Internet Protocol communications, such that delay sensitive data packets are not delayed by long multicast delivery periods.

Furthermore, scenario 500 considers a new client 520 entering the Hot Spot area 506 requesting a multicast stream 524 from one of the access points in the Multicast Admission Control Group 502. For example, if the request 522 is send to access point 504a, and the request 522 is for high bandwidth multicast stream 514, access point 504a admits the new client 520 and services the multicast stream 524. However, if the request 522 is for high bandwidth multicast stream 516, access point 504a denies the request and/or redirects the new client 520 to access point 504b for servicing of the multicast stream 524. If the request 522 is for some other multicast stream, access point 504a either admits, denies and/or redirects the new client 520 based on whether or not the access point 504a has the multicast bandwidth available to service the multicast stream 524, thereby providing multicast load balancing in accordance with principles of the present invention.

Similarly, if the request 522 is sent to access point 504b, and the request 522 is for high bandwidth multicast stream 516, access point 504b admits the new client 520 and services the multicast stream 524. However, if the request 522 is for high bandwidth multicast stream 514, access point 504b denies the request and/or redirects the new client 520 to access point 504a for servicing of the multicast stream 524. If the request 522 is for some other multicast stream, access point 504b admits, denies and/or redirects the new client 520 based on whether or not the access point 504b has the multicast bandwidth available to service the multicast stream 524.

If the request 522 is sent to access point 504c, and the request 522 is for high bandwidth multicast stream 514 or 516, access point 504c denies the request and/or redirects the new client 520 to either access point 504a or 504b, respectively, for servicing of the multicast stream 524. If the request 522 is for some other multicast stream, access point 504c admits, denies and/or redirects the new client 520 based on whether or not the access point 504c has the multicast bandwidth available to service the multicast stream 524.

Further in accordance with principles of the present invention, should none of the access points 504a-c in Multicast Admission Control Group 502 have the necessary multicast bandwidth available to service the multicast stream 524 requested by new client 520, the request is generally denied, and the multicast stream is not admitted and the multicast stream is not forwarded or is severely rate-limited. In this manner the present invention maximizes the aggregate available bandwidth in a Hot Spot area 506 covered by multiple access points 504a-c while protecting the integrity of existing high bandwidth multicast streams 514, 516 and unicast streams 518.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicants' general inventive concept.

We claim:

1. An apparatus, comprising:
a controller configured to be coupled to plurality of access points having a same coverage area, the controller is operable for controlling the operation of the plurality of access points and setting a maximum multicast bandwidth for the plurality of access points;
the controller configured for processing an admissions control request for a multicast stream having a bandwidth received from a client coupled to a first of the plurality of access points;
wherein the controller is configured to accept the admissions control request for the multicast stream responsive to determining the first access point is already servicing the multicast stream;
wherein the controller is configured to accept the admission control request responsive to determining the multicast stream is not being serviced by another of the plurality of access points and the first of the plurality of access points has sufficient bandwidth to service the multicast stream; and wherein the controller is configured to redirect the client to a second of the plurality of access points responsive to determining the second of the plurality of access points is servicing the multicast stream.

2. The apparatus of claim 1, wherein the plurality of access points are members of a Multicast Admissions Control Group.

3. The apparatus of claim 1, wherein the access point advertises that explicit admissions controls are in force for multicast streams so that the client is ensured that the requested multicast stream will not be rate limited.

4. The apparatus of claim 1, wherein the controller is configured to apply load balancing to select one of the plurality access points for servicing the multicast stream for the client responsive to determining none of the plurality of access points are servicing the multicast stream.

5. The apparatus of claim 4, wherein the controller comprises an IP multicast router that measures the bandwidth consumed by an IP multicast stream, which the IP multicast router is forwarding, over a period of time; where the IP multicast router forwards bandwidth information for IP multicast streams to the controller; and where the controller uses the bandwidth information to determine if a multicast stream can be admitted at an access point.

6. The apparatus of claim 1, wherein the client is able to determine whether the access point will accept the admissions control request for the multicast stream by including the admissions control request in a Probe Request.

7. The apparatus of claim 6, wherein the access point indicates multicast bandwidth availability in at least one of a Probe Response and a Beacon frame.

8. The apparatus of claim 1, further comprising the controller is configured to select a one of the plurality of access points to service a unicast stream, wherein the controller does not employ the selected access point to service multicast streams.

9. A method for multicast load balancing in a wireless network, comprising:
grouping a plurality of access points having a same coverage area into a multicast admissions control group;
setting a maximum Internet protocol multicast bandwidth for each of the plurality of access points;
receiving an admissions control request for a multicast stream having a bandwidth from a client at one of the plurality of access points;
determining whether the admissions control request from the client is for an admitted multicast stream;
providing the multicast stream to the client responsive to determining the multicast stream is an admitted multicast stream; and
providing the multicast stream to the client responsive to determining the multicast stream is not being serviced by any of the plurality of access points belonging to the multicast admissions control group where the bandwidth required for the multicast stream, plus the bandwidth currently used for all existing downlink multicast streams for the one of the plurality of access points does not exceed the maximum internet protocol multicast bandwidth for the access point.

10. The method of claim 9, wherein at least one of the access points advertises that explicit admissions controls are in force for multicast streams.

11. The method of claim 9, wherein the multicast admissions control is used to distribute multicast streams across access points in the same coverage area.

12. The method of claim 9, further comprising:
determining whether a requested multicast stream is being serviced by another access point within the Multicast Admissions Control Group; and
directing the client to the access point within the multicast admissions control group that is servicing the multicast stream responsive to determining the requested multicast stream is being serviced by another access point within the multicast admissions control group.

13. The method of claim 12, wherein admissions control are coordinated by a central access point controller that is in communication with the plurality of access points.

14. The method of claim 13, wherein the plurality of access points forward multicast admissions control requests from clients to the central access point controller.

15. The method of claim 13, wherein the central access point controller applies load balancing to admitted multicast streams to select a parent access point for the client.

16. The method of claim 9, wherein the client is able to determine which access point will accept the admissions control request for a downlink multicast stream by including the admissions control request in a Probe Request.

17. The method of claim 16, wherein the one of the access points indicates multicast bandwidth availability in at least one of a Probe Response and a Beacon frame.

18. A computer-readable medium of instructions having stored thereon instructions which when executed by a processor, cause the processor to perform the steps of:
grouping a plurality of access points having a same coverage area into a multicast admissions control group;
setting a maximum Internet protocol multicast bandwidth for the access points;
receiving an admissions control request for a multicast stream having a bandwidth from a client at one of the plurality of access points; and
determining whether the admissions control request from the client is for an admitted multicast stream;
providing the multicast stream to the client responsive to determining the multicast stream is an admitted multicast stream; and
providing multicast stream to the client responsive to determining the multicast stream is not being serviced by any of the plurality of access points belonging to the multicast admissions control group where the bandwidth required for the multicast stream plus bandwidth currently used for all existing downlink multicast streams does not exceed the maximum internet protocol multicast bandwidth for the access point.

19. The computer-readable medium of instructions of claim 18, further comprising instructions for forming a Multicast Admissions Control Group from the plurality of access points.

20. The computer-readable medium of instructions of claim 18, further comprising instructions for distributing multicast streams across access points in the same coverage area.

21. The computer-readable medium of instructions of claim 18, further comprising instructions for determining whether the requested multicast stream is being serviced by another access point; and
instructions for directing the client to the access point servicing the requested multicast stream responsive to the requested multicast stream is being serviced by another access point.

22. The computer-readable medium of instructions of claim 18, further comprising instructions for applying load balancing to admitted multicast streams to select a parent access point for the client.

23. A computer-readable medium having stored thereon instructions which when executed by a processor, cause the processor to perform the steps of:

grouping a plurality of access points having a same coverage area into a multicast admissions control group;

receiving an admissions control request from a client for a multicast stream having a bandwidth at one of the plurality of access points, determining whether the admissions control request is for an admitted multicast stream;

providing the multicast stream to the client responsive to determining the multicast stream is an admitted multicast stream; and rate limiting multicast stream to the client responsive to determining the multicast stream is an unadmitted stream.

24. The computer-readable medium of claim 23, further comprising means for the admissions control to be based on Internet Group Management Protocol snooping.

* * * * *